(No Model.)
G. W. POOL.
HORSE COLLAR.
No. 297,159. Patented Apr. 22, 1884.
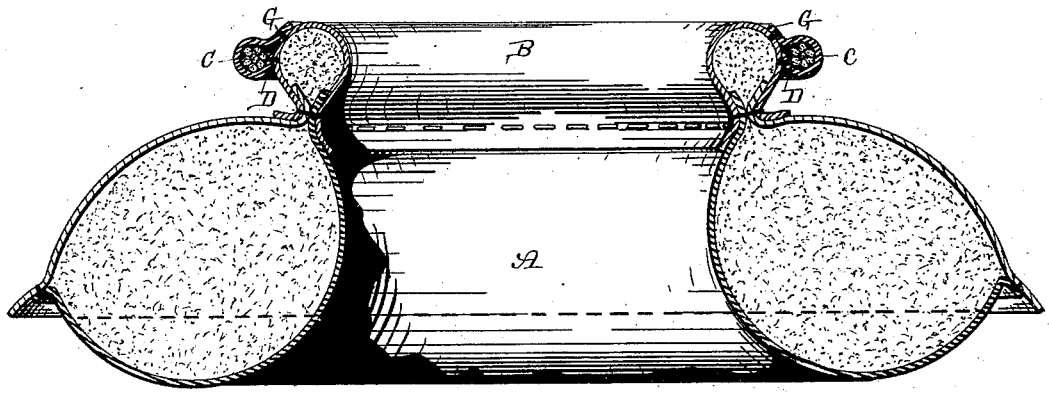
Witnesses.
Louis F. Gardner
J W Garner
Inventor.
Geo W Pool,
per
F. A. Lehmann,
Atty.

UNITED STATES PATENT OFFICE.

GEORGE W. POOL, OF LAMAR, MISSOURI.

HORSE-COLLAR.

SPECIFICATION forming part of Letters Patent No. 297,159, dated April 22, 1884.

Application filed December 14, 1883. (No model.)

*To all whom it may concern:*

Be it known that I, GEORGE W. POOL, of Lamar, in the county of Barton and State of Missouri, have invented certain new and useful Improvements in Horse-Collars; and I do hereby declare the following to be a full, clear, and exact description of the invention, such as will enable others skilled in the art to which it pertains to make and use it, reference being had to the accompanying drawing, which forms part of this specification.

My invention relates to an improvement in horse-collars; and it consists in the combination of a collar provided with a large rim, which forms a part thereof, with a second smaller rim, which is sewed to the outer side of the large rim in such a manner that it can be detached without injuring either the large rim or the collar, as will be more fully described hereinafter.

The object of my invention is to attach an additional smaller rim to the collar by seams or stitching of its own, so that should the stitching become cut or injured the collar itself will not be hurt.

The accompanying drawing represents a horizontal cross-section of a collar embodying my invention.

A represents an ordinary horse-collar, which is provided with the usual rim, B, which forms a part of the collar itself. To the outer side of this large rim B is sewed the smaller rim C by means of two separate seams, the inner one, D, of which is an inside seam, so as to be thoroughly protected from the hames. The outer seam, G, is formed on the outer side of the large rim, as no wear comes upon it and no special protection is needed. It will be seen that both of these seams D G are formed on the outer side of the larger rim B, and serve merely to secure the smaller rim in position. Were either of these seams cut or injured, the smaller rim C alone would be injured, without in any way injuring the collar itself. Where the smaller rim C is made a part of the collar itself by having its stitches form a part of the stitching of the collar, when these stitches become injured by the hames, the collar itself is injured and ruined. Where the rim C is attached to the collar by stitching of its own, as here shown, the rim can be removed from the collar at any time without injuring the collar in the least. This rim C serves to keep the hames in place, and when it is filled with rope or other stiff material it serves to brace and strengthen the collar and hold it in place.

I am aware that a collar having both a large and a small rim is old; but heretofore the smaller rim has been sewed to the outer rim in such a manner that its stitches form a part of the collar itself, and then when the hame cuts the rim the collar itself is destroyed.

The object of my invention is to overcome this defect. It is further the object and effect of the invention and improvement to prevent the hame breast-strap ring from cutting or injuring the collar, as it does in all other inventions or collars, and this is accomplished by the hame not being allowed to go so deep into the crease in the collar.

Having thus described my invention, I claim—

The combination of the collar A, the rim B, and the smaller rim C, the rim C being secured to the rim B by means of the two seams D G, whereby the rim C can be detached without injury to the collar, substantially as shown and described.

In testimony whereof I affix my signature in presence of two witnesses.

GEORGE W. POOL.

Witnesses:
    FRED B. SUTHERLAND,
    JOHN A. POOL.